United States Patent [19]

Larikka

[11] 4,413,485
[45] Nov. 8, 1983

[54] FLANGE FORMING DRILL MEANS

[75] Inventor: Leo Larikka, Vaasa, Finland

[73] Assignee: G. A. Serlachius Oy, Mantta, Finland

[21] Appl. No.: 305,650

[22] PCT Filed: Jan. 29, 1981

[86] PCT No.: PCT/FI81/00007

§ 371 Date: Sep. 24, 1981

§ 102(e) Date: Sep. 24, 1981

[87] PCT Pub. No.: WO81/02119

PCT Pub. Date: Aug. 6, 1981

[30] Foreign Application Priority Data

Jan. 30, 1980 [FI] Finland .................................. 800279

[51] Int. Cl.³ .............................................. B21D 51/40
[52] U.S. Cl. ......................................... 72/71; 72/112;
72/120; 72/125; 29/157 T
[58] Field of Search ......................... 72/70-72,
72/120, 112, 325, 324, 125; 29/157 T; 408/92,
211, 224, 225

[56] References Cited

U.S. PATENT DOCUMENTS

| | | | |
|---|---|---|---|
| 3,592,038 | 7/1971 | Larikka | 72/112 |
| 3,714,808 | 2/1973 | Larikka | 72/325 |
| 3,844,149 | 10/1974 | Hansen | 72/71 |
| 3,884,060 | 5/1975 | Larikka | 72/71 |

FOREIGN PATENT DOCUMENTS

| | | | |
|---|---|---|---|
| 2434498 | 6/1975 | Fed. Rep. of Germany | 72/71 |
| 50843 | 4/1976 | Finland | 72/112 |

*Primary Examiner*—Lowell A. Larson
*Attorney, Agent, or Firm*—Mason, Kolehmainen, Rathburn & Wyss

[57] ABSTRACT

A flange forming drill means for drilling a hole through the side of a pipe or the like and forming a hole encircling flange includes a drill rod mountable on a rotating power source with a drill bit at the lower end and associated retractable flange forming members which are extendable down below the edges of a drilled hole by turning an adjustment cone mounted on the drill rod. The adjustment cone is enclosed and keyed to an externally smooth, protective shield selectively securable to a locking ring on the drill at a plurality of relative angular positions around the drilling axis. The locking flange includes a circumferentially extending groove provided with holes or recesses at opposite ends defining terminal positions of locking so that in a first terminal locking position, the forming members are retracted completely within the outer surface of the drill bit and in a second terminal locking position the forming members extend or project outwardly from the drill bit for forming a flange around the drilled hole of a desired internal diameter as the drill bit is moved outwardly from the pipe.

9 Claims, 3 Drawing Figures

FLANGE FORMING DRILL MEANS

BACKGROUND OF THE INVENTION

The present invention relates to a flange forming drill means for drilling a hole through the side of a pipe or the like and for forming a flange, which encircles the hole. The drill includes a drill rod which is adapted to be mounted on a rotating power source and provided with a drill bit at the lower end. Flange forming members are mounted on the drill and after the hole has been drilled, the members are extended down below the edges of the hole by turning an adjustment member that is rotatably mounted on the drill rod for retracting and extending the members.

One such flange forming drill means is disclosed in U.S. Pat. No. 3,592,038, and that apparatus has proven itself very useful when a flanged hole is to be formed in the side of pipe e.g. for the connection of a branch pipe. For locking the flange forming members in place, either in an extended flange forming position or in a retracted or hole drilling position, it is necessary that a rotating adjustment member be secured or locked in various angular positions around the drilling axis. For this purpose the Finnish Patent Publication No. 50843 discloses a locking system, which is manually pressed in a radial direction to release the lock and permit manual rotation of the adjustment member. However, such a device is inconvenient to use because one hand must perform two simultaneous crosswise actuating movements, namely pressing the lock in radial direction while turning an adjustment cone 90°. In addition to this inconvenience, the lock member and top ends of the forming pins produce a safety risk, because they project outwardly of an adjustment cone and rotate therewith. There is also another apparent safety risk, namely a possibility of injuring the fingers in the forming pins or the lock, while the adjustment cone is being gripped for the adjustment, and injury could occur if electrical current is accidentally switched on to start the drill. The risk also exists if the adjustment cone is gripped during so-called post-running of the drill.

OBJECT OF THE INVENTION

An object of the invention is to provide an improved drill means, so that the above mentioned operating trouble and safety risks are overcome.

BRIEF SUMMARY OF THE INVENTION

The foregoing object of the invention is accomplished in an illustrated embodiment characterized in that an adjustment member is externally enclosed in a smooth protective shield which is engaged to rotate the adjustment member, so that the member and shield rotate together around the drilling axis. Also, a drill rod is fitted with a locking member and the shield and adjustment member are removably locked in various angular positions around the drilling axis with respect to the drill rod.

The lock can be released by lifting the shield upwards on the drill rod, and this can be achieved automatically by contact with stop elements secured to the frame of the drill. The frame includes support legs which engage the work piece, and after a drilling operation, the drill means is pressed further downwards until the stop elements on the legs are engaged against the lower surface of the protective shield thus lifting the shield upwards on the drill rod. The friction force acting between the stop elements and the shield causes rotation of the shield and the adjustment member on the drill rod resulting in the extension of flange forming members down below the edges of the hole. Thereafter, as the drill rod is retracted upwardly while the flange forming members are extended, an upstanding flange is formed around the edge of the drilled hole.

BRIEF DESCRIPTION OF THE DRAWINGS

A preferred embodiment of the invention is described in more detail in the following specification and with reference to the accompanying drawings, in which.

DESCRIPTION OF A PREFERRED EMBODIMENT

Figure 1:
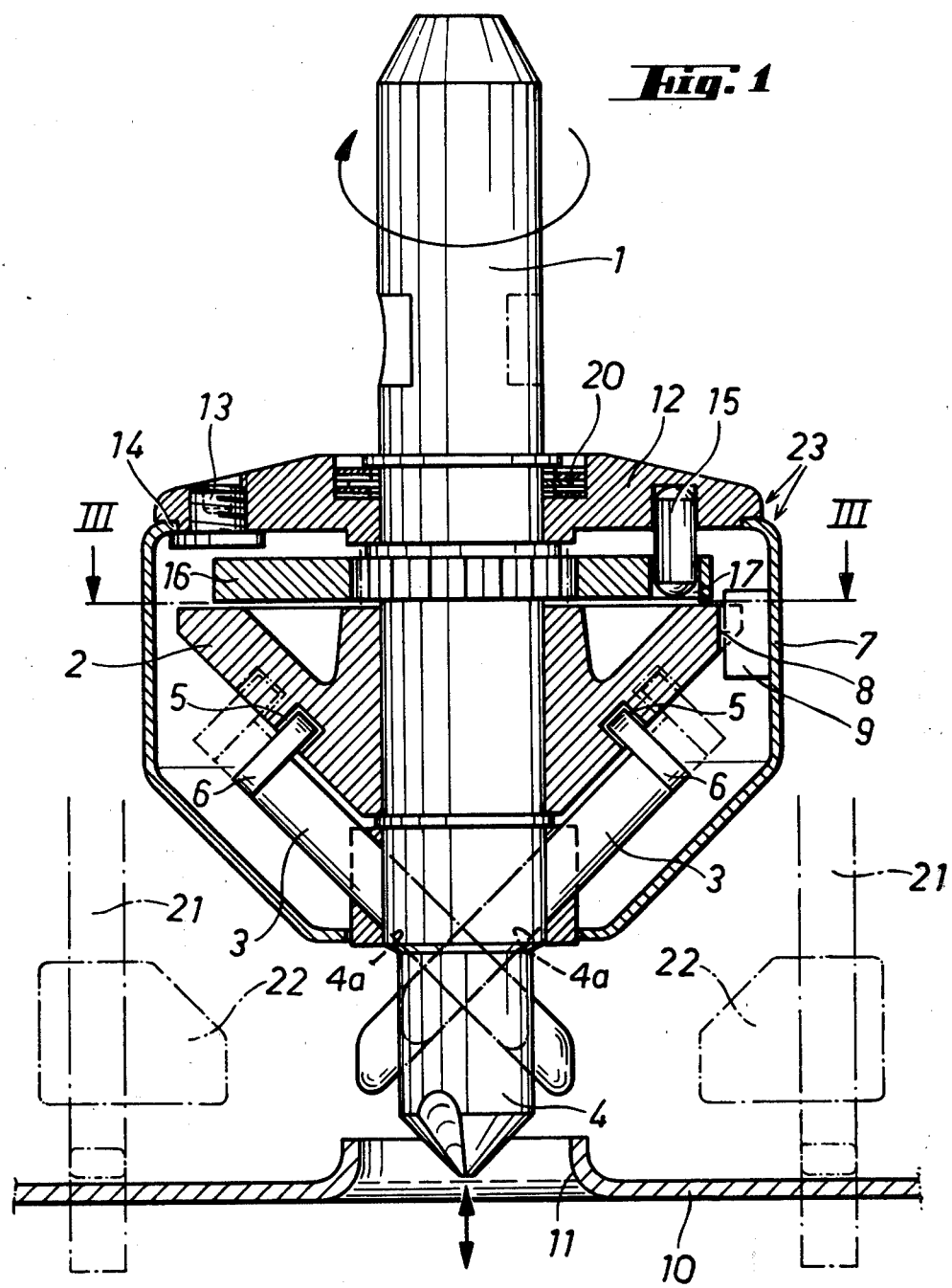
FIG. 1 shows a flange forming drill means in accordance with the invention in a vertical cross sectional view.

In accordance with the present invention, new and improved flange forming drill means includes a drill rod 1 adapted to be mounted on a rotating power source and having a lower end comprising a drill bit 4. Around the rod 1 is mounted an adjustment device or cone 2 having a conical lower face provided with helically pitched guide grooves 5, which receive gripping extensions 6 provided at the upper ends of a pair of flange forming pins 3. The forming pins 3 extend crosswise in guideways or bores 4a running through the drill rod 1 and drill bit 4.

By rotating the adjustment cone 2, the pins are extended to project a predetermined distance outwardly of the outer side surface of the drill bit 4 and the pins can be completely retracted within said outer surface of the drill bit 4 when initially drilling a hole. In the latter position the bit 4 is used for drilling a hole through the sidewall surface of a pipe 10 and in the former position, with the forming pins 3 extended, a collar flange 11 is formed around the edge of a completed hole by pulling the rotating drill means upwardly from the wall of the pipe wall.

Figure 2:
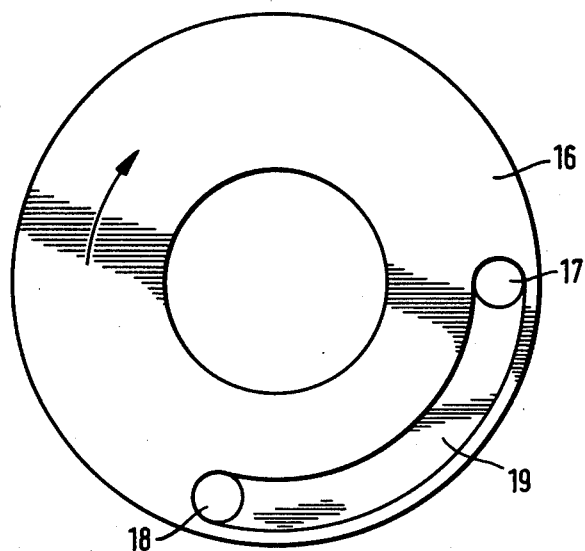
FIG. 2 is a plan view of a locking flange in accordance with the invention.
Figure 3:
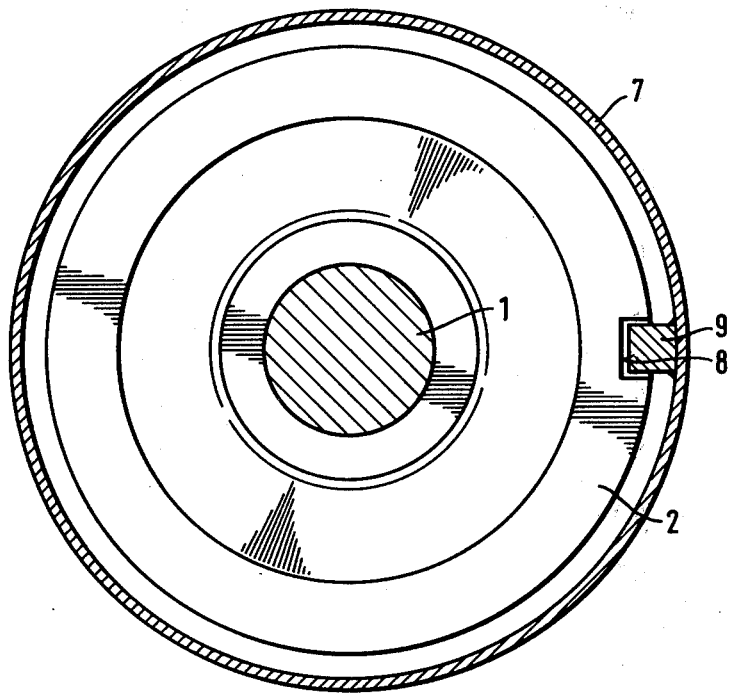
FIG. 3 is a sectional view taken along the line III—III of FIG. 1.

According to the invention, the adjustment cone 2 as well as the upper ends of the pins 3 are enclosed within an externally smooth outer protective shield 7. A lug 9 fixed on the internal surface of the shield 7 is engaged with a recess 8 in the rim of the adjustment cone 2, so that relative rotation between the shield and the cone around the drilling axis is prevented. Thus, the adjustment cone 2 is rotated on the drill rod by turning the protective shield 7. The top of the shield 7 is closed with an externally smooth cover 12 attached with screws 13 which engage an inturned edge flange 14 at the upper end of the shield. An engagement pin 15 secured to the cover extends downwardly into engagement in one or more holes formed in a locking flange 16 which is rigidly fixed to rotate with the drill rod 1. The forming pins 3 are locked in an extended position when the pin 15 is in the hole 17, and the locking flange 16 includes another hole 18 (FIG. 2) spaced at a certain angle from the hole 17. Between the holes 17 and 18 is proved a circumferential groove 19 in which the end of pin 15 can pass while moving between terminal locking positions defined at the ends of the groove by the holes 17 and 18.

A spring plate 20 is mounted on the drill rod 1 and biases the cover 12 and shield 7 downwardly toward the bite so that the pin 15 is normally retained in the hole 17 or 18. When the forming pins 3 are to be moved from an extended position (as shown in solid lines) to a retracted position (as shown by the broken lines), the shield 7 is lifted upwardly on the drill rod 1 whereby the end of the pin 15 is disengaged from the hole 17 and the shield is turned until the end of the pin 15 reaches and seats in the hole 18 at the opposite end of the groove 19. In the opposite direction, this can be done while the drill means is rotating. Lifting of the shield 7 on the drill rod may be achieved by a friction force applied when the shield contacts stop elements 22 after a hole has been completed effecting relative rotation between the shield and lock ring from one terminal locking position to the other.

The operation can be automated by utilizing stop elements 22 which are mounted on supporting legs 21 used for supporting the body of the rotating power source in position on the wall of the pipe. After a hole has been drilled, the drill bit is urged further downwardly, until the conical lower face of the rotating shield 7 contacts the stop elements 22 to effect an uplifting of the shield 7 on the drill rod 1 to release the locking action between the pin 15 and the hole 18 of the lock flange 16. Friction, between the shield and stops 22 decelerates the rotational speed of the shield as compared to the drill rod 1 and the locking flange secured thereto. This results in relation rotation of the adjustment cone 2 of the drill rod 1 whereby the forming pins 3 are extended outwardly and downwardly below the edges of the drilled hole in the pipe wall.

In the practice, this happens immediately after the hole is drilled and the face of the shield 7 impinges against the elements 22. The relative axial movement between shield 7 and the drill rod 1 can also be utilized for further automation of the operation in such a way that the upward movement of the shield 7 relative to the rod and rotating power source, activates a switch on an auger screw which retracts the drill upwardly from the pipe. The operator merely has to start the drill rotating and press the bit downwardly to drill the hole. The machine automatically takes care of the extension of the forming pins 3 and the initiation of the return or retraction of the mechanism when the hole is completed to begin formation of the flange.

In accordance with the invention, with the flange forming members 3 in a retracted condition (dotted lines, FIG. 1) and the pin 15 on the cover 12 engaged in the hole 18 of the lock ring to retain pins in the retracted position, the power source supporting the drill rod 1 is energized to rotate the drill bit 4 in a clockwise or drilling direction as indicated by the arrow in FIG. 1. The rotating drill bit is then moved axially downward to drill a hole in the wall of the pipe 10. When the hole is completed the drill is moved further downwardly until a lower end of the cross bores 4a are at a level below the inside wall surface of the pipe wall. At this time the lower frusto-conical surface of the rotating shield 7 is pressed into contact with the stop elements 22 and this engagement moves the shield axially upwardly relative to the drill rod against the bias of the spring 20 until the lower end portion of the lock pin 15 is retracted out of engagement with the hole 18 in the lock ring 16.

As the pin is retracted, frictional engagement between the rotating shield 7 and the stop elements 22 tends to retard rotation of the shield thus permitting relative rotation between the adjustment cone 2 and the lock ring 16 until the pin 15 engages the opposite end of the circumferential groove 19 at a terminal position above the hole 17. The relative rotation between the adjustment cone 2 and the drill rod 1 as the lock pin 15 moves from the hole 18 to the hole 17 in the groove 19 of the lock ring 16, causes the flange forming members 3 to move from the retracted position to an extended position (solid lines FIG. 1) projecting outwardly and angularly downwardly from the outer side surface of the drill bit 4 at a level below inside wall surface of the pipe 10.

With the flange forming members fully extended as shown, the rotating drill rod 1 is moved axially upwardly from the wall of the pipe 10 and as this occurs the frusto-conical surface of the shield 7 moves away from the stop elements 22 permitting the pin 15 to seat and lock in the hole 17 of the lock ring 16 to lock the flange forming members 3 in the extended position. Upon further upward travel of rotating drill rod, the upper and outer surfaces of the flange forming members 3 move into engagement with the inside wall surface of the pipe around the edges of the drilled hole and form an upwardly extending, peripheral flange 11 as shown. The inside diameter of the flange so formed is determined by the amount of extension of the members 3 from the outer side surface of the drill bit 4.

The adjustment cone 2 is detachably locked on the drill rod 1 by means of the shield 7, cover 12 and locking pin 15 and flange 16. A special feature of the invention permits loosening of the screws 13 and selected turning of the protective shield 7 and cover 12 relative to each other. By this adjustment it is possible to vary the distance which the forming pins 3 are extended from the drill bit in one of the terminal locking positions with the pin 15 in the hole 17. Thus, it is possible to set up a desired internal diameter for the flange 11 to be formed in the pipe wall. If desired, intermediate holes may be provided in the groove 19 between the terminal holes 17 and 18 for various different flange dimensions. The rotation of the shield 7 and cover 12 relative to each other is particularly intended for adjustment of the tolerance of a predetermined flange dimension, and a boundary line 23 between the shield 7 and 12 can be provided with a nonius-type of scale.

Although the present invention has been described with reference to an illustrated embodiment thereof, it should be understood that numerous other modifications and embodiments can be made by those skilled in the art that will fall within the spirit and scope of the principles of this invention.

What is claimed as new and desired to be secured by Letters Patent is:

1. Flange forming drill means for drilling a hole through the side of a pipe or the like and forming a hole encircling flange comprising:

a drill rod mountable on a rotating power source and having a drill bit adjacent a lower end portion, a plurality of retractable, flange forming members mounted on said lower end portion for forming a flange around the edge of a drilled hole after drilling has been completed, said flange forming members mounted for movement between a retracted position wherein lower ends are contained within an outer surface of said drill bit while said hole is being drilled and an extended position projecting downwardly and outwardly of said surface, an adjustment element mounted on said drill rod and engaging said flange forming members for moving the same between said extended and retracted positions upon relative rotation between said element and said drill rod, protective shield means around said adjustment element and said flange forming members mounted in nonrotating engagement with said adjustment element for rotating said element on said drill rod, and locking means secured to rotate with said drill rod and removably lockable with respect to said adjustment element in a plurality of relative angular positions around the drilling axis of said bit for selectively securing said flange forming members in said retracted and extended positions.

2. The flange forming drill means according to claim 1, characterized in that said locking means comprises a pin and a locking flange having a pair of pin receiving recesses and defining terminal locking positions between said flange and shield including a first terminal locking position wherein said flange forming members are in said retracted position with lower ends thereof completely within the outer surface of said drill bit and a second terminal locking position wherein said flange forming members extend and project outwardly of said outer surface of said drill bit to correspond to a desired internal diameter of a flange to be formed therewith.

3. The flange forming drill means according to claim 1, characterized in that said locking means is releasable by upward lifting of said shield on said drill rod.

4. The flange forming drill means according to claim 3, characterized in that said first and second terminal locking positions are selected so that, during uplifting of the said shield means while said drill rod is rotating in a drilling direction, a release of said locking means is achieved so that frictional force applied to said shield means permits relative rotation between said shield means and said locking means from a first terminal locking position to the other.

5. The flange forming drill means according to claim 2, characterized in that said shield means is closed with an externally smooth cover having a lower surface and said pin depends from said cover and is adapted to seat within a selected one of said locking holes on said locking flange to provide said terminal positions of locking.

6. The flange forming drill means according to claim 5, including means for securing said cover and a lower portion of said shield means with each other in various selected relative angular positions around the drill axis of said drill rod.

7. The flange forming drill means according to claim 1, characterized in that an internal face of said shield means is keyed to rotate said adjustment element to move together around the drilling axis of said drill bit.

8. The flange forming drill means according to claim 1, characterized in that said shield means includes a frusto-conical lower surface adapted to engage stop elements for biasing said shield upwardly on said drill rod.

9. The flange forming drill means according to claim 8, including in combination, supporting legs for said rotating power source, and said stop elements mounted on said legs, said stop elements positioned to engage said shield means after a hole is drilled to provide uplifting of said shield means on said drill rod and frictionally decelerating the rotation of said shield means with respect to said rotating drill rod, whereby said locking means is shifted from said first to said second terminal locking position and said flange forming members are extended for forming a flange around a hole.

* * * * *